United States Patent
Dougherty

(10) Patent No.: US 6,976,374 B1
(45) Date of Patent: Dec. 20, 2005

(54) VEHICLE PEDAL LOCK

(76) Inventor: Christopher Dougherty, The Grove, Apt. 14, Hartlepool (GB) TS26 9NE ( * ) Notice: Subject to any disclaimer, the term of this patent is extended or adjusted under 35 U.S.C. 154(b) by 0 days.

(21) Appl. No.: 10/905,898

(22) Filed: Jan. 25, 2005

(51) Int. Cl.$^7$ ............................................. B60R 25/00
(52) U.S. Cl. ........................................ 70/199; 70/202
(58) Field of Search ..................... 70/198–203, 237, 70/238, 254; 180/287; 244/224

(56) References Cited

U.S. PATENT DOCUMENTS

| | | | |
|---|---|---|---|
| 1,382,570 A * | 6/1921 | Tanner ........................ 70/200 |
| 1,599,896 A * | 9/1926 | Kakuske ...................... 70/199 |
| 2,330,536 A * | 9/1943 | Zimmermann ............... 70/199 |
| 2,336,829 A * | 12/1943 | Zimmermann et al. ....... 70/199 |
| 2,931,207 A | 4/1960 | Fisher |
| 3,631,694 A | 1/1972 | Teroux |
| 3,710,606 A | 1/1973 | Prince |
| 3,777,518 A | 12/1973 | Meyers |
| 4,134,282 A | 1/1979 | Callahan |
| 4,699,238 A * | 10/1987 | Tamir ......................... 180/287 |
| 4,903,510 A | 2/1990 | Surles |
| 4,912,952 A | 4/1990 | Magrobi |
| 5,028,086 A | 7/1991 | Smith |
| 5,040,387 A | 8/1991 | Knott, Jr. |
| 5,094,092 A | 3/1992 | Hsieh |
| 5,251,465 A | 10/1993 | Hwang |
| 5,327,724 A | 7/1994 | Tribuzio et al. |
| 5,344,221 A | 9/1994 | MacWilliam |
| 5,454,244 A | 10/1995 | Liou |
| 5,528,216 A | 6/1996 | Main |
| 5,715,710 A * | 2/1998 | De Lucia et al. ............. 70/202 |
| 5,906,121 A * | 5/1999 | Mankarious ................. 70/199 |
| 5,911,391 A * | 6/1999 | Russ et al. ................... 244/224 |
| 5,911,765 A * | 6/1999 | DaSilva ...................... 70/202 |
| 5,979,197 A * | 11/1999 | Mellini et al. ............... 70/199 |
| 6,202,456 B1 * | 3/2001 | Vickers ...................... 70/202 |
| 6,439,012 B1 * | 8/2002 | Chen ......................... 70/202 |
| 6,439,013 B1 * | 8/2002 | Chen ......................... 70/202 |
| 6,575,002 B1 * | 6/2003 | Hsu .......................... 70/202 |
| 6,662,894 B2 * | 12/2003 | Chantrasuwan et al. .... 180/287 |
| 6,666,052 B1 * | 12/2003 | Wu ........................... 70/202 |
| 6,766,674 B2 * | 7/2004 | Simon ........................ 70/202 |
| 6,792,780 B1 * | 9/2004 | De Lucia .................... 70/202 |
| 2002/0014097 A1 * | 2/2002 | Vito .......................... 70/202 |
| 2002/0129630 A1 * | 9/2002 | Chen ......................... 70/202 |

* cited by examiner

Primary Examiner—Lloyd A. Gall
(74) Attorney, Agent, or Firm—Donald R. Schoonover

(57) ABSTRACT

A vehicle pedal lock includes an inner portion that is attached to a brake pedal and which can also be attached to a clutch pedal and an outer portion that locks the pedals to the inner portion whereby the pedals cannot be operated. The portions have handles that telescopingly fit together and can be locked together.

2 Claims, 5 Drawing Sheets

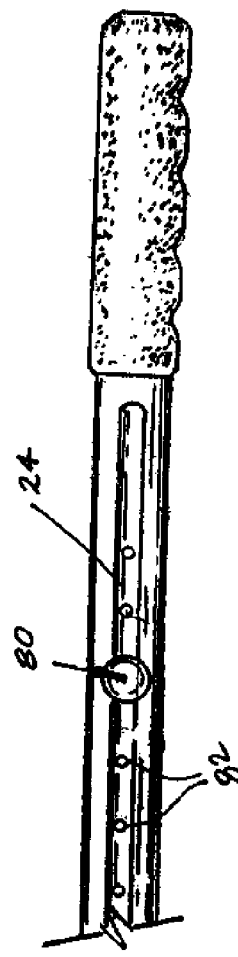
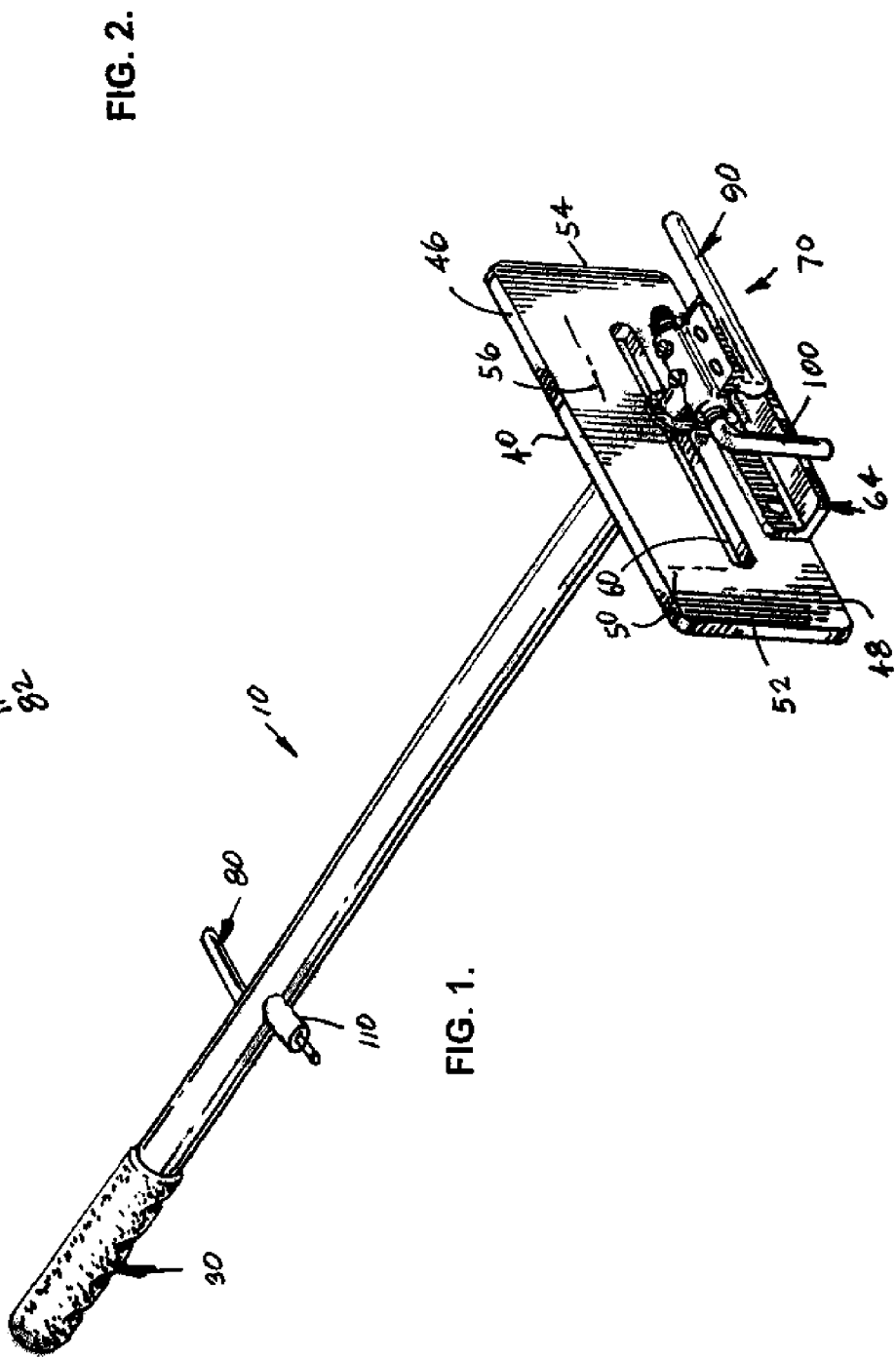
FIG. 2.
FIG. 1.

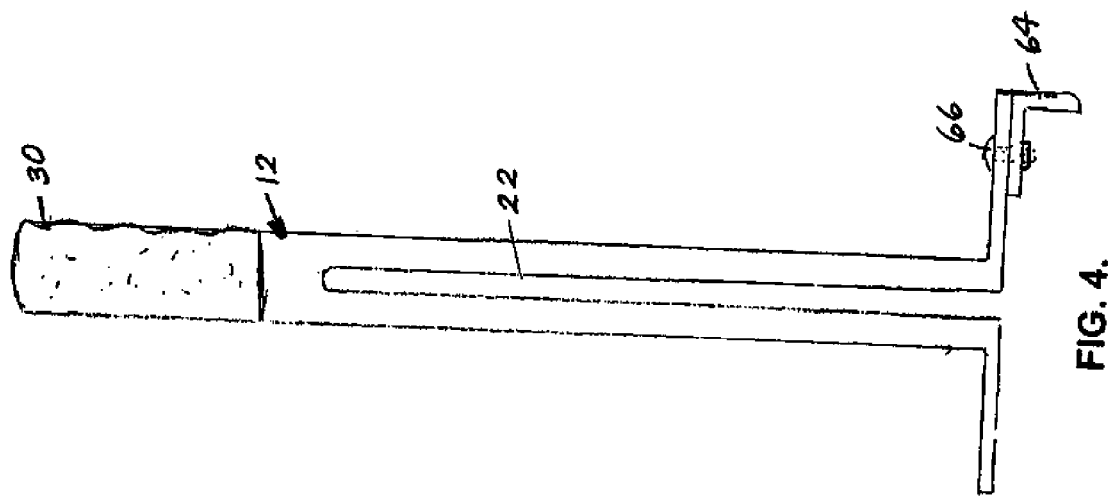
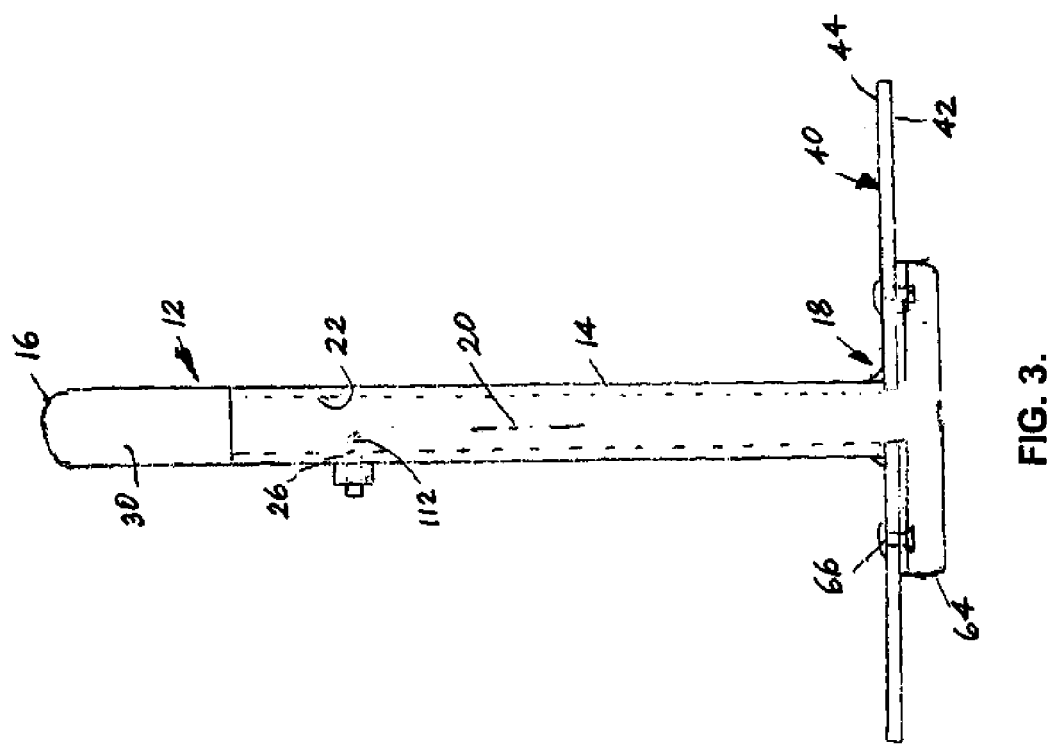

VEHICLE PEDAL LOCK

BACKGROUND OF THE INVENTION

The present invention relates to the general art of locks, and to the particular field of special applications for locking automotive vehicles.

Car theft is one of the most prevalent crimes in most cities. In some cities, some vehicles can be stolen in less than one minute. This problem raises insurance rates for everyone and creates headaches for car owners and law enforcement agencies alike.

In view of this problem, the art contains numerous examples of locks and tracking devices and systems, all of which are intended to defeat a potential thief, or track the vehicle so a thief cannot dispose of the vehicle before being apprehended.

Many of these locks are complicated and difficult to place and thus may not be used. Some of the locks are extremely expensive and thus may be marginally effective.

Therefore, there is a need for a lock for a motor vehicle which is secure yet which is inexpensive and easy to operate.

While some locks, such as the steering wheel "club" are fairly easy to operate, they are also easy to defeat by a potential thief who has the right tools. This problem arises because the "club" is positioned in a location that is easily accessed by a potential thief. The thief need only break through a window and he has immediate access to the club.

Therefore, there is a need for a lock for a motor vehicle which is easy to set and release by an authorized person, yet which is positioned in a location that is inconvenient and difficult to reach for a potential thief who may wish to defeat the lock.

Still further, some mechanical locks are specific to particular vehicles and cannot be used on other vehicles. For example, certain steering wheel locks will fit one variety of vehicles but cannot be fit on the steering wheel of other vehicles.

Therefore, there is a need for a lock for a motor vehicle which is amenable to use on a wide variety of vehicles.

PRINCIPAL OBJECTS OF THE INVENTION

It is a main object of the present invention to provide a lock for a motor vehicle which is secure yet which is easy to operate.

It is another object of the present invention to provide a lock for a motor vehicle which is amenable to use on a wide variety of vehicles.

It is another object of the present invention to provide a lock for a motor vehicle which is easy to set and release by an authorized person, yet which is positioned in a location that is inconvenient and difficult to reach for a potential thief who may wish to defeat the lock.

SUMMARY OF THE INVENTION

These, and other, objects are achieved by a pedal lock that includes an inner portion that is attached to a brake pedal of a motor vehicle and which can also be attached to a clutch pedal of the motor vehicle and an outer portion that locks the pedals to the inner portion whereby the pedals cannot be operated. The portions have handles that telescopingly fit together and can be locked together.

Using the pedal lock embodying the present invention will permit a person to quickly and securely lock the pedals of his motor vehicle in a manner that will prohibit operation of the motor vehicle. The lock is quite secure, yet is easy to operate and set. By disabling the brake and/or clutch pedals, the lock embodying the present invention is positioned to be very inconvenient and difficult to reach; therefore, a potential thief will not be able to "smash and run" because the lock is located in a difficult-to-reach location. However, the lock is easily disengaged by the owner of the vehicle who has a key.

BRIEF DESCRIPTION OF THE DRAWING FIGURES

FIG. 1 is a perspective view of a pedal lock embodying the present invention.

FIG. 2 is an elevational view of a handle portion of the pedal lock shown in FIG. 1.

FIG. 3 is a plan view of an outer portion of the pedal lock embodying the present invention.

FIG. 4 is a plan view of the outer portion shown in FIG. 3 with the outer portion rotated 90°.

DETAILED DESCRIPTION OF THE PREFERRED EMBODIMENT

Figure 7:
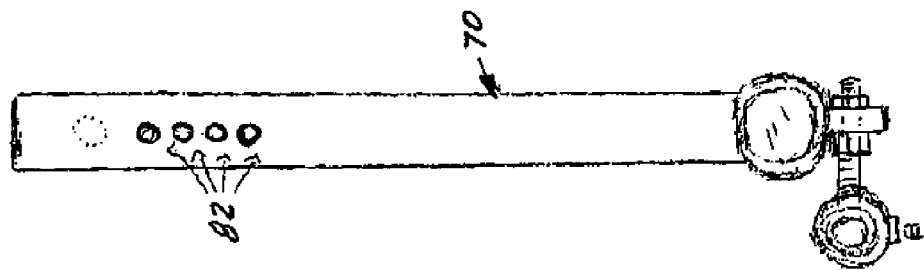
FIG. 7 is a side view of the inner portion of the pedal lock as seen 90° from FIG. 6.
Figure 6:
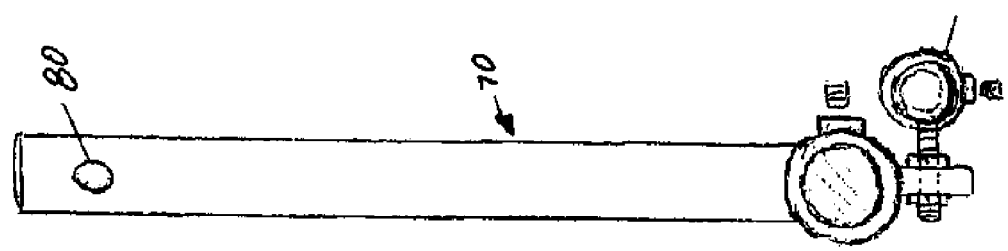
FIG. 6 is a side view of the inner portion of the pedal lock.
Figure 5:
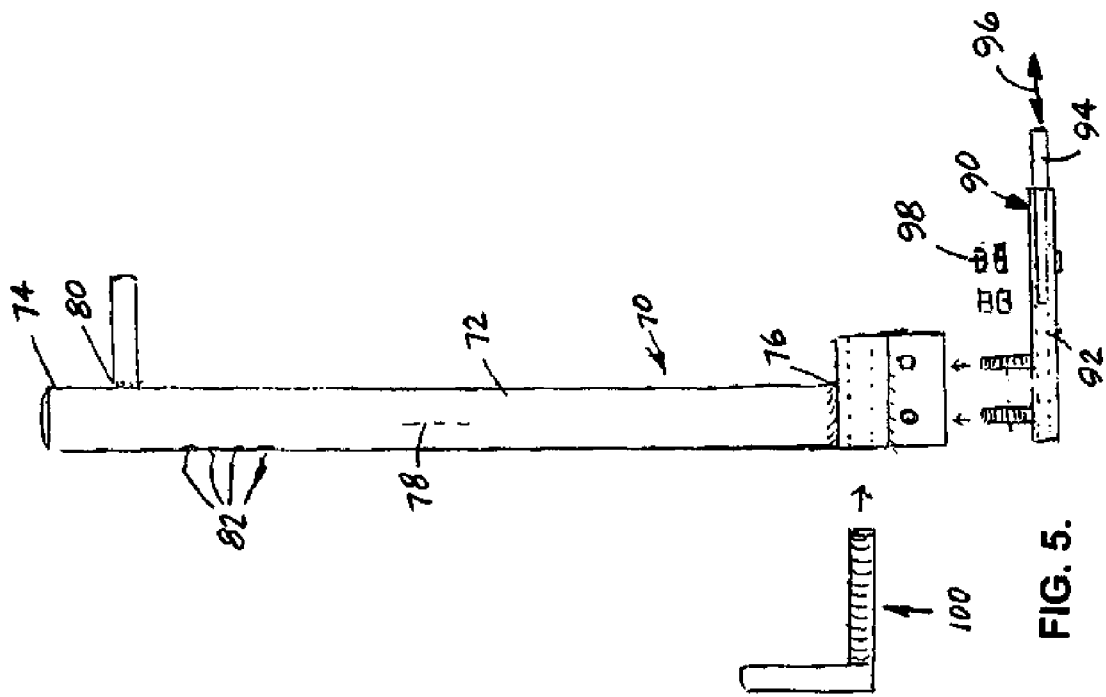
FIG. 5 is an exploded view of an inner portion of the pedal lock embodying the present invention.
Figure 9:
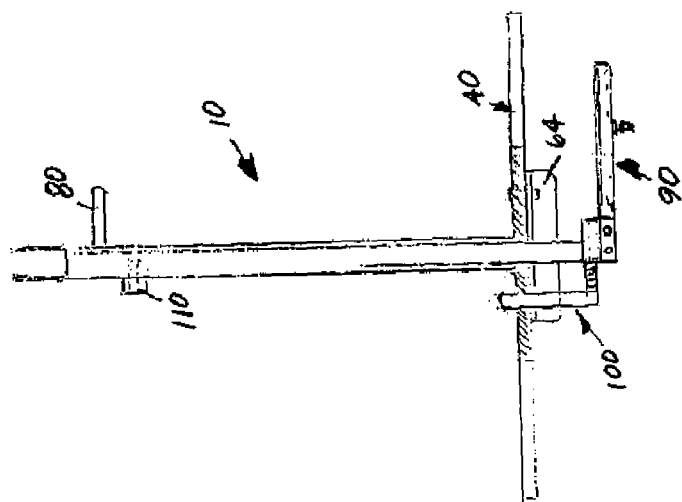
FIG. 9 is a plan view of the assembled pedal lock of the present invention.
Figure 8:
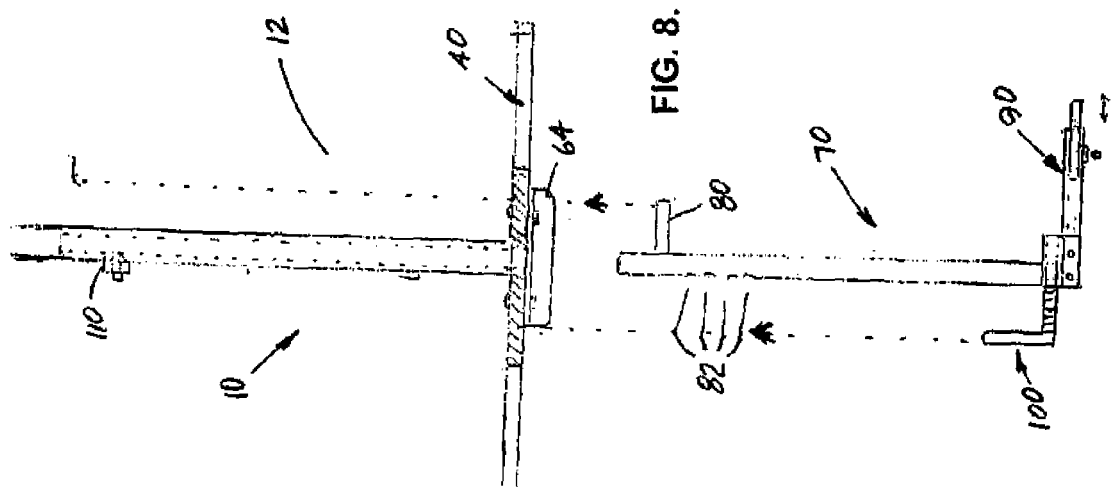
FIG. 8 shows the inner and outer portions of the pedal lock embodying the present invention.

Other objects, features and advantages of the invention will become apparent from a consideration of the following detailed description and the accompanying drawings.

Referring to the Figures, it can be understood that the present invention is embodied in a pedal lock 10 which achieves the above-stated objectives.

Lock 10 comprises a first portion 12 which is best shown in FIGS. 3 and 4 and which includes a cylindrical body 14 which has a first end 16 which is a top end when first portion 12 is in use, a second end 18 which is a bottom end when first portion 12 is in use, and a longitudinal axis 20 which extends between first end 16 and second end 18. A bore 22 extends from second end 18 towards first end 16. A slot 24 (see FIG. 2) is defined in cylindrical body 14 and extends in the direction of longitudinal axis 20. A locking pin-accommodating hole 26 is defined through body 14 for a purpose that will be understood from the teaching of the ensuing disclosure.

A handle 30 is located on first end 16 so lock 10 can be easily gripped and manipulated.

A foot plate 40 is unitary with second end 18 of cylindrical body 14 and can be affixed thereto by welds or the like. Foot plate 40 is best shown in FIGS. 1 and 3.

Foot plate 40 includes a first surface 42 which is a bottom surface when first portion 12 is in use, a second surface 44 which is a top surface when first portion 12 is in use, a first side 46 which is a top side when first portion 12 is in use, a second side 48 which is a bottom side when first portion 12 is in use, and a width dimension 50 which extends between first side 46 and second side 48.

Foot plate 40 further includes a first end 52, a second end 54, and a length dimension 56 which extends between first end 52 and second end 54. Foot plate 40 is contained in a plane that is perpendicular to longitudinal axis 20 of cylindrical body 14.

A slot 60 is defined along the length dimension 56 of foot plate 40 and intersects bore 22 of cylindrical body 14. A pedal-engaging stop plate 64 is fixedly mounted on first surface 42 of the foot plate 40 adjacent to slot 60 such as by bolts 66, or the like, and extends in the length direction of the foot plate 40.

As is best shown in FIGS. 1, 5, 6 and 7, lock 10 further comprises a second portion 70 which is an inner portion in use. Second or inner portion 70 includes a cylindrical body 72 which is sized and shaped to be telescopingly accommodated in bore 22 defined in cylindrical body 14 and to extend through slot 60 defined in the foot plate 40. Cylindrical body 72 includes a first end 74 which is a top end when inner portion 70 is in use, a second end 76 which is a bottom end when inner portion 70 is in use, and a longitudinal axis 78 which extends between first end 74 and second end 76. A handle 80 extends transversely to longitudinal axis 78 and is located to extend through slot 24 defined in cylindrical body 14 of first or outer portion 12. A plurality of locking pin-receiving holes 82 are defined in body 72 at locations that are spaced apart from each other in the direction of longitudinal axis 78.

A clutch pedal-engaging element 90 is fixedly mounted on second end 76 of body 72 and is located adjacent to first surface 42 of the foot plate 40 when in use whereby the foot pedal is located between second end 76 of body 72 and clutch pedal-engaging element 90. Clutch pedal-engaging element 90 extends in the direction of length dimension 56 of the foot plate 40. The clutch pedal-engaging element 90 includes two sections 92 and 94 which are movably connected to each other as indicated by double-headed arrow 96 so various spacings between the foot pedals of a motor vehicle can be accommodated. Mounting elements, such as bolts 98, or the like, can be used to fix element 90 to the body 72.

A brake pedal-engaging element 100 is rotatably mounted on second end 76 of body 72. Brake pedal-engaging element 100 is located adjacent to first surface 42 of foot plate 40 when in use whereby the foot pedal is located between second end 18 of body 14 of outer portion 12 and brake pedal-engaging element 100. The brake pedal-engaging element 100 extends in the direction of length dimension 56 of the foot plate 40 and is rotatable on inner portion 70 to rotate between a first position shown in solid lines in FIG. 1 orientated transversely to slot 60 defined through the foot pedal and a second position oriented to extend through slot 60 defined in the foot plate 40.

A lock element 110 is mounted on body 14 of first portion 12 and includes a lock pin 112 that extends through locking pin-accommodating hole 26 defined through body 14 of first portion 12 and into one of the locking pin-receiving holes 82 defined in body 72 of inner portion 70 when first portion 12 is locked to second portion 70. Lock element 110 includes a key lock or a combination lock, or the like, and will lock the inner portion 70 to the outer portion 12 and these two portions will not be able to be moved with respect to each other unless lock element 110 is removed. This will lock the pedals and prevent use of the vehicle until lock 10 is removed.

Figure 11:
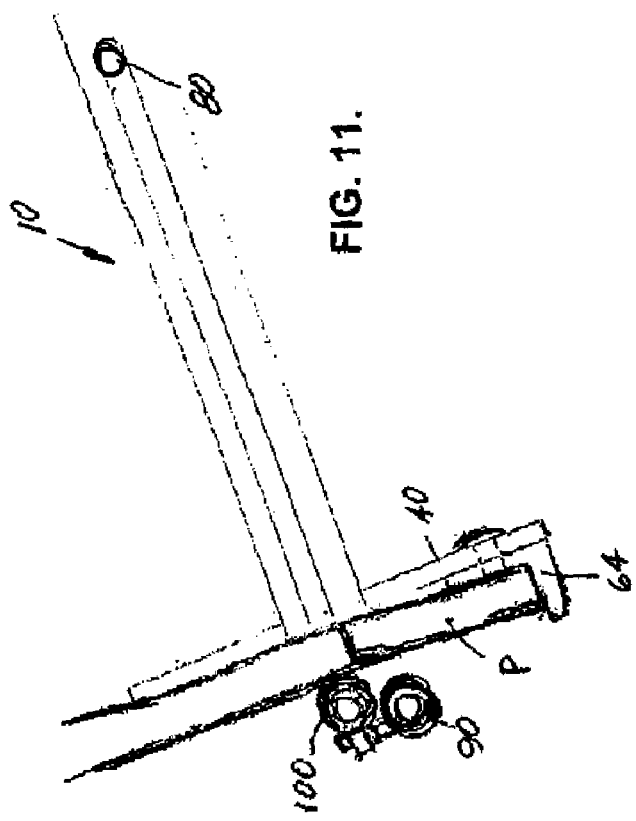
FIG. 11 is a side view showing the pedal lock attached to a brake pedal.
Figure 12:
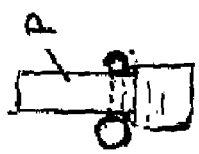
FIG. 12 shows a detailed view of the pedal lock attached to a brake pedal.
Figure 10:
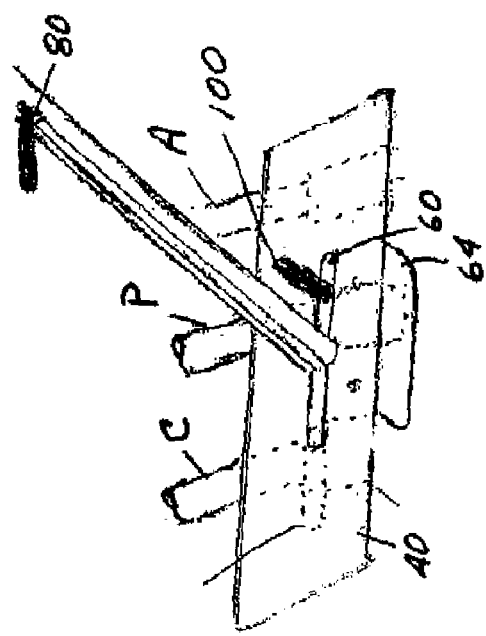
FIG. 10 shows the pedal lock attached to a brake pedal of a motor vehicle.

As can be understood from the foregoing, operation of lock 10 is as follows: the first and second portions 12, 70 are manipulated relative to each other to move the brake pedal and clutch pedal elements away from the foot plate 40. The elements are then manipulated to sandwich brake pedal P and clutch pedal C between the brake pedal-engaging element 100 and the clutch pedal-engaging element 90 and the foot plate 40. As can be seen in FIG. 11, the brake pedal is also forced against stop plate 64 to further disable that pedal. The first and second portions 12, 70 are then moved with respect to each other to secure the brake pedal and the clutch pedal. Lock element 110 is then set to lock the first portion 12 to the second portion 70. Lock 10 then disables the brake pedal and the clutch pedal until lock 110 is released. While the brake pedal and the clutch pedal have been discussed, it will be understood by those skilled in the art that either pedal can be disabled by itself without the other, or an accelerator pedal can be disabled either by itself or in conjunction with the other or both of the other pedals. This situation is indicated in FIG. 10, with accelerator pedal A being shown as well as brake pedal P and clutch pedal C.

It is to be understood that while certain forms of the present invention have been illustrated and described herein, it is not to be limited to the specific forms or arrangements of parts described and shown.

What is claimed is:

1. A pedal lock comprising:
   a) a first outer portion which includes
   (1) a cylindrical body having a first end which is a top end when said first portion is in use, a second end which is a bottom end when said first portion is in use, a longitudinal axis which extends between the first end of the cylindrical body of said first portion and the second end of the cylindrical body of said first portion, a bore that extends from the second end of the cylindrical body of said first portion towards the first end of the cylindrical body of said first portion, a slot defined in the cylindrical body and which extends in the direction of the longitudinal axis of the cylindrical body of said first portion, and a locking pin accommodating hole defined through the body of said first portion,
   (2) a handle on the first end of the cylindrical body of said first portion, and
   (3) a foot plate which is unitary with the second end of the cylindrical body of said first portion and which includes
   (A) a first surface which is a bottom surface when said first portion is in use,
   (B) a second surface which is a top surface when said first portion is in use,
   (C) a first side which is a top side when said first portion is in use,
   (D) a second side which is a bottom side when said first portion is in use,
   (E) a width dimension which extends between the first side of the foot plate and the second side of the foot plate,
   (F) a first end,
   (G) a second end,
   (H) a length dimension which extends between the first end of the foot plate and the second end of the foot plate,
   (I) the foot plate being contained in a plane that is perpendicular to the longitudinal axis of the cylindrical body of said first portion,
   (J) a slot defined along the length dimension of the foot plate and which intersects the bore of the cylindrical body of said first portion, and (K) pedal-engaging stop plate fixedly mounted on the first surface of the foot plate adjacent to the slot defined in the foot plate and which extends in the length direction of the foot plate;

b) a second portion which is an inner portion in use and which includes (1) a cylindrical body which is sized and shaped to be telescopingly accommodated in the bore defined in the cylindrical body of said first portion and to extend through the slot defined in the foot plate, the cylindrical body of said inner portion further including a first end which is a top end when said inner portion is in use, a second end which is a bottom end when said inner portion is in use, a longitudinal axis which extends between the first end of the cylindrical body of said inner portion and the second end of the cylindrical body of said inner portion, a handle which extends transverse to the longitudinal axis of the body of said inner portion and which is located to extend through the slot defined in the cylindrical body of said outer portion, a plurality of locking pin receiving holes defined in the body of said inner portion at locations that are spaced apart from each other in the direction of the longitudinal axis of the body of said inner portion, (2) a clutch pedal engaging element fixedly mounted on the second end of the body of said inner portion and which is located adjacent to the first surface of the foot plate when in use whereby the foot plate is located between the second end of the body of said outer portion and the clutch pedal engaging element, the clutch pedal engaging element extending in the direction of the length dimension of the foot plate, the clutch pedal engaging element including two sections which are movably connected to each other, and (3) a brake pedal engaging element rotatably mounted on the second end of the body of said inner portion, the brake pedal engaging element being located adjacent to the first surface of the foot plate when in use whereby the foot plate is located between the second end of the body of said outer portion and the brake pedal engaging element, the brake pedal engaging element extending in the direction of the length dimension of the foot plate and being rotatable on said inner portion to rotate between a first position orientated transverse to the slot defined through the foot plate and a second position oriented to extend through the slot defined in the foot plate; and c) a lock element mounted on the body of said first portion and which includes a lock pin that extends through the locking pin accommodating hole defined through the body of said first portion and into one of the locking pin receiving holes defined in the body of said inner portion when said first portion is locked to said second portion.

2. A pedal lock comprising:

a) a first portion having a first end which is a top end when said first portion is in use, a second end which is a bottom end when said first portion is in use and a foot plate fixedly mounted on the second end, the foot plate having a slot defined therein;

b) a second portion that is slidably received in said first portion and which includes a clutch pedal engaging element and a brake pedal engaging element thereon, the foot plate being interposed between the clutch pedal engaging element and the second end of said first portion, the brake pedal engaging element being rotatable on said second portion to rotate between a first position orientated transverse to the slot defined in the foot plate and a second position oriented to extend through the slot defined in the foot plate.

* * * * *